United States Patent
Toscano

(10) Patent No.: US 8,315,262 B2
(45) Date of Patent: Nov. 20, 2012

(54) REVERSE TIMESTAMP METHOD AND NETWORK NODE FOR CLOCK RECOVERY

(75) Inventor: Orazio Toscano, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 331 days.

(21) Appl. No.: 12/678,163

(22) PCT Filed: Feb. 7, 2008

(86) PCT No.: PCT/EP2008/051495
§ 371 (c)(1),
(2), (4) Date: Jun. 23, 2010

(87) PCT Pub. No.: WO2009/037002
PCT Pub. Date: Mar. 26, 2009

(65) Prior Publication Data
US 2010/0265970 A1    Oct. 21, 2010

(30) Foreign Application Priority Data
Sep. 21, 2007 (EP) .................................... 07116925

(51) Int. Cl.
*H04L 12/28* (2006.01)
(52) U.S. Cl. ................................................. 370/395.62
(58) Field of Classification Search .............. 370/395.62
See application file for complete search history.

(56) References Cited

U.S. PATENT DOCUMENTS 6,400,683 B1 * 6/2002 Jay et al. .................. 370/229
2004/0109519 A1 * 6/2004 Mizukami et al. ........... 375/362

OTHER PUBLICATIONS

PCT International Search Report, dated Oct. 17, 2008, in connection with International Application No. PCT/EP2008/051495.
Takazawa, T. et al. "VBR Video transmission with isochronous and asynchronous transfer mode over wireless 1394" Wireless Personal Multimedia Communications, 2002. The 5th International Symposium on, Oct. 27-30, 2002, Piscataway, NJ, USA, IEEE, vol. 3, Oct. 27, 2002, pp. 1088-1092, XP010619620, ISBN: 978-0-7803-7442-3.

* cited by examiner

*Primary Examiner* — Jianye Wu
*Assistant Examiner* — Wanda Z Russell
(74) *Attorney, Agent, or Firm* — Potomac Patent Group PLLC

(57) ABSTRACT

A method of clock recovery of Time Division Multiplex signal in a packet network, wherein a first Provider Edge receives a timing message from a second Provider Edge and upon reception of said timing message a counter of said first Provider Edge is increased. The first Provider Edge sends to the second Provider Edge encapsulated Time Division Multiplex packet traffic and each packet sent to the second Provider Edge causes the counter to decrease. The first Provider Edge compares value of the counter with an Upper Threshold value and with a Low Threshold value and increases a rate of generation of the encapsulation packets if the counter is above said Upper Threshold or reduces the rate of generation of the encapsulation packets if the counter is below said Low Threshold.

20 Claims, 3 Drawing Sheets

REVERSE TIMESTAMP METHOD AND NETWORK NODE FOR CLOCK RECOVERY

CROSS-REFERENCE TO RELATED APPLICATIONS

This application claims priority under 35 U.S.C. §119 to European Patent Application No. 07116925.4 filed Sep. 21, 2007, which is hereby incorporated herein by reference in its entirety.

TECHNICAL FIELD

The present invention relates to telecommunications networks operating in Time Division Multiplex, in general, and in particular to a method of clock recovery of Time Division Multiplex signals carried over packet networks.

BACKGROUND

Among the several issues that need to be taken into account in the deployment of the Next Generation Network, the clock recovery of the Time Division Multiplex (TDM) signals carried over packet networks is no doubt in the number of the most crucial and critical ones. Due to the not synchronous nature of present packet networks (e.g. Ethernet), the different methods today defined to recover the timing of TDM services exhibit a number of applications limits and synchronization quality problems that need to be addressed. In particular the packet delay variation (PDV) caused by the packet network has a big impact on the quality of the recovered clock in all the methods of timing recovery.

TDM networks are based upon a hierarchical timing distribution. One or more extremely accurate primary reference clocks are at the top of the hierarchy and with their Stratum 1 accuracy characteristics are suitable to provide reference timing signals to secondary clocks with Stratum 2 accuracy. Secondary clocks are then suitable to provide reference timing to Stratum 3 nodes implementing in this way the proper hierarchy of time synchronization required to meet the telecom network performance and availability requirements. This strict timing distribution scheme is designed to limit jitter and wander accumulation with the consequent negative impacts in terms of buffer under/overflow and relative service errors and unavailability.

When emulating TDM transport the packet delay variation (PDV) introduced by packet network may be mitigated by placing the TDM packets into a jitter buffer. The problem with this approach is that the ingress TDM source timing reference is not available on the egress side, and therefore the precise rate to use to clock out data from the jitter buffer and end-user equipment is not known.

Known methods of recovering TDM source timing in this scenario include adaptive methods, differential methods and network synchronous methods.

In the adaptive case ingress and egress Provider Edges have no access to the network clock and the service clock is carried asynchronously over the packet switched network (PSN).

In the differential and network synchronous methods the ingress and egress Provider Edges have access to the network clock and the service clock is carried asynchronously over the PSN in the former case and synchronous with the PSN in the latter one. Network synchronous and differential methods have good performance, but they put the problem of the reference timing distribution to all the end equipments.

Different approaches to obtain this goal include the use of primary reference clock (PRC, as defined in ITU-T G.811) distributed architecture such as atomic clocks or GPS receivers (this approach, however, could be very expensive) or master timing distribution to the end nodes.

A master timing distribution scheme can be achieved using a synchronous physical layer (e.g. synchronous Ethernet Physical Layer, or Synchronous Digital Hierarchy (SDH)), or via new emerging methods (e.g. IEEE 1588, Network Time Protocol—NTP).

Differential and adaptive methods allow the service clock transparency while in network synchronous scenarios the service clock is not preserved.

When timing transparency is required and no accurate reference timing is available in the end node the only alternative is to attempt the clock recovery process based exclusively on the circuit emulated TDM traffic (adaptive methods). These kinds of applications are very frequent and therefore it is very important to be able to handle the related timing issues.

By making reference to adaptive methods it is understood that the class of techniques used to recover the clock are based exclusively on the TDM circuit emulation traffic. This operation is possible taking into account that the source TDM device generates bits at a constant bit rate determined by its clock. These bits, however, are received in packets affected by the described negative effects of packet delay variation (PDV). As a consequence, the clock recovery task becomes a filtering and averaging process to negate the PDV effects and capture the original stream average rate.

Phase-locked loop (PLL) solutions are widely used to regenerate a clean clock able to approximate the original bit rate as much as possible.

Two known methods of adaptive clock recovery employs adapting a local clock (controlling the local PLL) that is based on the level of the receiver's jitter buffer or on the comparison of the packet arrival time with the expected arrival time.

Main problems of the adaptive PLL based methods known in the art are the convergence time required and the latency that the jitter buffer size involves. The convergence time is a consequence of long period of observation of the level position or packet arrival times the PLL needs before locking onto the source clock. The latency problem is a consequence of the jitter buffer size that has to be big enough to handle centering problems (the buffer level may settle far from the desired buffer center position) and lower the consequent probability of underflow/overflow.

In conclusion, the adaptive methods known in the art exhibit a strong dependency of the regenerated clock on the packet delay variation and convergence time and latency.

SUMMARY

It is the object of the present invention to obviate at least some of the above disadvantages and provide a node for communications network adapted to recover clock of Time Division Multiplex signals as well as an improved method of clock recovery of Time Division Multiplex signals.

Accordingly, the invention seeks to preferably mitigate, alleviate or eliminate one or more of the disadvantages mentioned above singly or in any combination.

According to a first aspect of the present invention there is provided a method of clock recovery of Time Division Multiplex signal in a packet network. A first network node, also referred herein as a first Provider Edge, receives a timing message from a second node, also referred herein as a second Provider Edge, and upon reception of said timing message a counter of said first Provider Edge is increased. The first Provider Edge sends to the second Provider Edge encapsulated Time Division Multiplex packet traffic and each packet sent to the second Provider Edge causes the counter to decrease. The first Provider Edge compares value of the counter with an Upper Threshold value and increases a rate of generation of the encapsulation packets if the counter is above said Upper Threshold. The first Provider Edge also compares the counter with a Low Threshold value and reduces the rate of generation of encapsulation packets if the counter is below said Low Threshold.

Preferably the size of the encapsulation packet is constant.

Preferably if the counter is between said Low Threshold and Upper Threshold the rate of generation of encapsulation packets is unchanged.

Because the first Provider Edge does not have control over the rate it receives data from a first Customer Edge (or terminal equipment) the rate of generation of the encapsulation packets can be preferably changed by reducing or increasing a payload size that is encapsulated in said encapsulation packets. The data received from the first Customer Edge are output from a FIFO buffer of the first Provider Edge and if the counter increases above the Upper Threshold the first Provider Edge reduces the payload size of the encapsulation packets and if the counter decreases below the Low Threshold the first Provider Edge increases the payload size of the encapsulation packets.

Preferably, in order to simplify processing of the encapsulation packet at its destination, justification information indicating how the payload size of the packet differs from a default payload size is added to the encapsulation packet. It is also preferred option that the encapsulation packet contains information about justification applied in all previous encapsulation packets sent from the first Provider Edge to the second Provider Edge in the current communication session.

Also preferably, in order to mitigate adverse effects resulting from losing a timing message sent from the second Provider Edge to the first Provider Edge, the method comprises reading by the first Provider Edge a timestamp from the received timing message and comparing it with a timestamp from the previously received timing message. In the next step, a time period between these two timestamps is calculated and if the time period is bigger than the time period between two consecutive timestamps the value of the counter is corrected.

In a preferred option the timing message comprises information about a difference between a writing address and a reading address of an input FIFO buffer of the second Provider Edge. If it is detected at the first Provider Edge that the difference between the writing address and the reading address of the input FIFO buffer of the second Provider Edge is smaller than a first predefined value the first Provider Edge reduces the payload size. The first Provider Edge increases the payload size if said difference between the writing address and the reading address is bigger than a second predefined value.

According to a second aspect of the present invention there is provided a communications network node adapted to operate in Time Division Multiplex. The node comprises a message elaboration unit for receiving timing messages from a second Provider Edge. The node further comprises a message encapsulation unit, which is adapted to encapsulate Time Division Multiplex traffic into packets and to send these encapsulation packets to the second Provider Edge. The node also comprises a counter and a first comparison unit. The counter is increased upon reception of the timing message and decreased upon sending the encapsulation packet. The first comparison unit is adapted to compare the counter with an Upper Threshold value and with a Low Threshold value, wherein the node is adapted to increase a rate of generation of the encapsulation packets if the counter is above said Upper Threshold or to reduce the rate of generation of encapsulation packets if the counter is below said Low Threshold.

Preferably the size of the encapsulation packet is constant.

Preferably the rate of generation of encapsulation packets is left unchanged if the counter is between said Low Threshold and Upper Threshold.

The node comprises a FIFO buffer and the rate of generation of encapsulation packets depends on the encapsulated payload size output from said FIFO buffer. The node is adapted to reduce the payload size and thus increases the rate of generation of encapsulation packets if the counter increases above the Upper Threshold. The node is also adapted to increase the payload size and thus reduces the rate of generation of encapsulation packets if the counter decreases below the Low Threshold.

Preferably the message elaboration unit is adapted to read a timestamp from the received timing message and to compare it with a timestamp from the previously received timing message. The message elaboration unit is further adapted to calculate time period between these two timestamps and to correct the counter if the time period between these two timestamps is bigger than the time period between two consecutive timestamps. This has the benefit that in case of a loss of a timing message the counter is updated to a correct value (i.e. to the value the counter would have been at should the message not be lost) and adverse effects of such loss are mitigated.

The encapsulation unit is adapted to reduce the payload size if the message elaboration unit detects that the difference between the writing address and the reading address of the input FIFO buffer of the second Provider Edge is smaller than a first predefined value and adapted to increase the payload size if said difference between the writing address and the reading address is bigger than a second predefined value.

According to a third aspect of the present invention there is provided a communications network operable in Time Division Multiplex. The network comprises at least a first Customer Edge connected to a first Provider Edge by a first Time Division Multiplex connection, a second Customer Edge connected to a second Provider Edge by a second Time Division Multiplex connection. The first Provider Edge is adapted to receive a timing message from the second Provider Edge and a counter in said first Provider Edge is increased upon reception of the timing message. The first Provider Edge is also adapted to send to the second Provider Edge encapsulated Time Division Multiplex packet traffic and the counter is decreased upon sending an encapsulation packet to the second Provider Edge. The first Provider Edge compares the counter with an Upper Threshold value and with a Low Threshold value and increases a rate of generation of the encapsulation packets if the counter is above said Upper Threshold or reduces the rate of generation of encapsulation packets if the counter is below said Low Threshold.

According to a fourth aspect of the present invention there is provided a communications network node adapted to operate in Time Division Multiplex. The node comprises a timing message generation unit for sending timing messages, a clock, and a counter running with said clock. The value of the counter is added to the timing messages in said timing message generation unit. The communications network node further comprises a receiving FIFO buffer for receiving encapsulation packets from a communications network node as defined in the second aspect of the present invention, an address generator adapted to generate read addresses of the receiving FIFO buffer, a gap circuit connected to the receiving FIFO buffer and to a second FIFO buffer. The gap circuit is adapted to forward clock edges in positions of payload and masking other clock edges. The communications network node also comprises a Phase Locked Loop unit adapted to recover from the gapped clock signal a clock signal used for timing the payload encapsulated in said encapsulation packets.

Further features of the present invention are as claimed in the dependent claims.

The present invention provides the benefit of more accurate results in comparison to present adaptive techniques especially in high delay variation conditions. What is also important, the solution does not require special upgrades in the network but only on the ingress and egress ends of the path. Moreover, the solution does not require any external network reference clock and can be implemented with no bandwidth penalty in comparison with other known adaptive implementations. It is a significant advantage of the present invention that the first Provider Edge uses timing information received from the second Provider Edge to generate its traffic towards the second Provider Edge, but with no need to synchronize to the clock of the second Provider Edge. In other words, it means that the first Provider Edge is able to receive different timing information from different Provider Edges and to generate traffic towards all of them still working with its single own clock domain.

BRIEF DESCRIPTION OF THE DRAWINGS

The present invention will be understood and appreciated more fully from the following detailed description taken in conjunction with the drawings in which.

DETAILED DESCRIPTION

The term Customer Edge (CE) herein below refers to a device where one end of a service originates and/or terminates. The Customer Edge is given a mechanism (e.g. Pseudo Wires as defined in IETF RFC3985 or any other equivalent mechanism) that carries the essential elements of the service from one node to another node or nodes over a Packet Switched Network and then a Provider Edge (PE) is a device that provides such mechanism to the Customer Edge.

Figure 1:
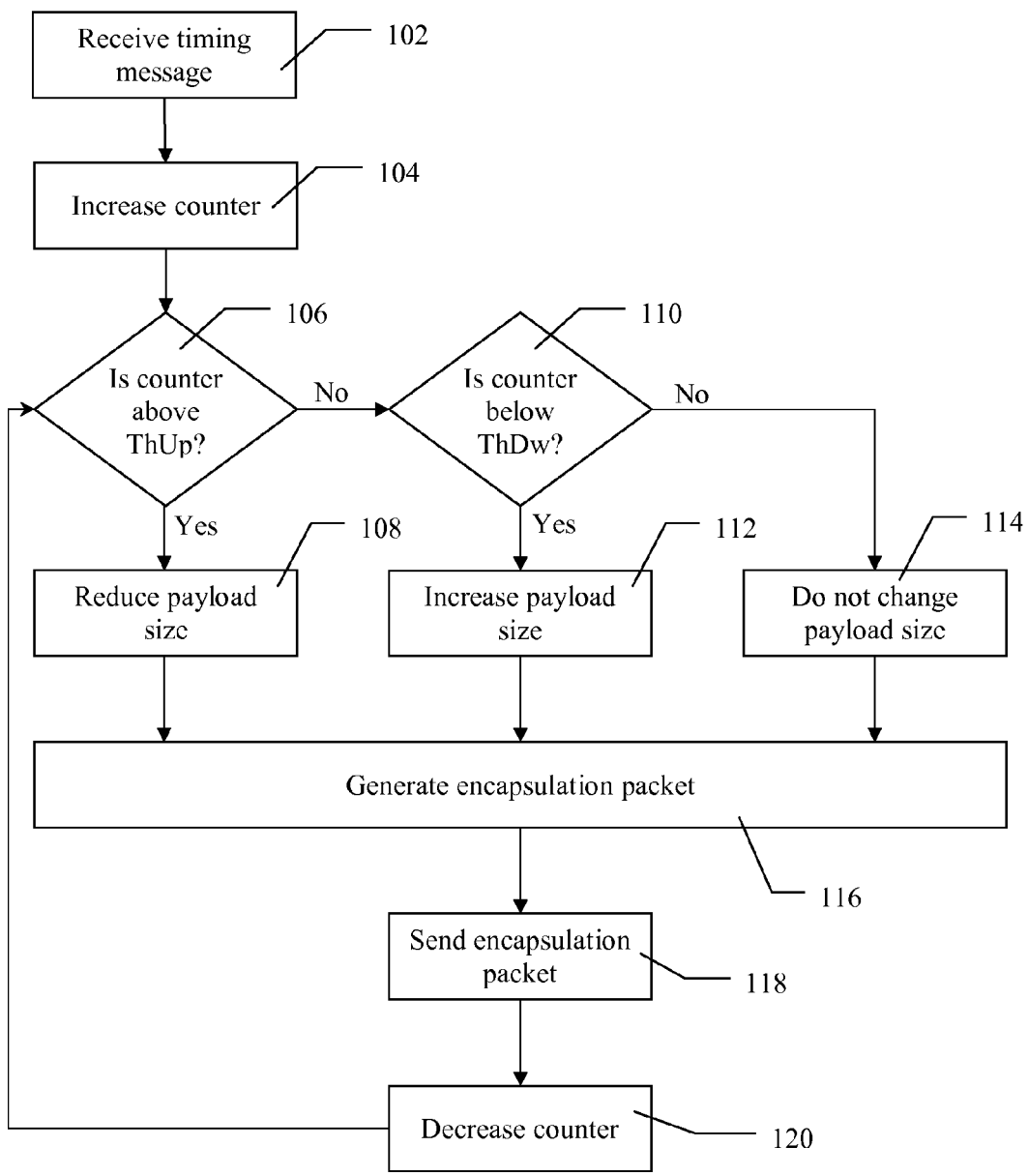
FIG. 1 is a diagram illustrating method of clock recovery in one embodiment of the present invention.
Figure 2:
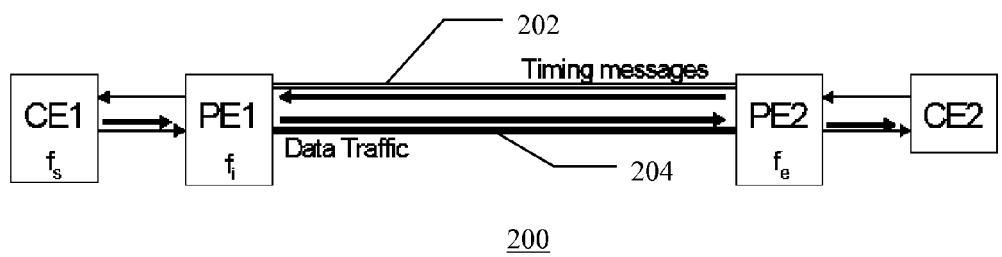
FIG. 2 is a diagram illustrating a network in one embodiment of the present invention.

With reference to FIG. 1 and FIG. 2 a method of clock recovery of Time Division Multiplex signal in a packet network 200 is presented. A first Provider Edge PE1 receives 102 timestamp information from a second Provider Edge PE2. This is illustrated by the upper arrow 202 between elements PE1 and PE2 in FIG. 2. In various embodiments of the invention the timestamp information can be coded in several different ways and a message elaboration unit 302 decodes it. In one embodiment the second Provider Edge PE2 inserts into the timestamp field the value of its internal counter running with its reference clock. The timestamp is read by the message elaboration unit 302 of the first Provider Edge PE1. In this case if the first Provider Edge PE1 receives two consecutive timing messages, one with the value 200 (decimal) and the other with the value 300 it can calculate that 100 reference clock cycles of the second Provider Edge PE2 passed from their relative transmitting times, which means that the message elaboration unit 302 is able to calculate how many reference clock cycles of the second Provider Edge PE2 passed since the last valid received timing message.

The first Provider Edge PE1 comprises a counter 304 and the value of this counter is increased 104 upon reception 102 of a timing message by the message elaboration unit 302.

The first Provider Edge PE1 sends 118 to the second Provider Edge PE2 encapsulated Time Division Multiplex packet traffic. In one embodiment a PWE3 encapsulation can be used. Taking into account the bandwidth of the PWE3 payload (e.g. E1=2048 kb/s) and the reference clock frequency of the second Provider Edge PE2 the message elaboration unit 302 is able to calculate how many packets the second Provider Edge PE2 expected in the relative time to maintain a locked stable state. PWE3 stands for Pseudo Wire Edge to Edge Encapsulation and it is a technique that IETF describes to encapsulate a PDH flow (e.g. E1) into a packet network (RFC4553). It has to be noted, however, that PWE3 is only one of many encapsulation techniques that can be used here.

The counter 304 is decreased 120 upon each encapsulation packet sent 118 to the second Provider Edge PE2. To illustrate operation of the message elaboration unit 302, the counter 304 and the encapsulation unit 306 it can be assumed that in one embodiment every packet encapsulates 64 bytes of payload, 116, and the timestamp reference clock of the second Provider Edge is 2048 Kb/s. If the message elaboration unit 302 calculates that 1049 clock cycles of the second Provider Edge passed from the previous valid timing message received, it can calculate that the second Provider Edge PE2 expected two packets (64 Bytes per packet*2 packets=128 Bytes*8 bits=1024 bits) with 25 bits remainder to be taken into account in the following elaboration iteration. So the Increase Signal has to toggle twice and the value "2" will be added to the counter 304.

The first Provider Edge PE1 comprises a first comparison unit 308 that compares 106 the value of the counter with an upper threshold ThUp value and a rate of generation of the encapsulation packets is increased if the counter is above said upper threshold ThUp. When the counter value increases above the upper threshold ThUp it is an indication that the second Provider Edge PE2 expects more packets from the first Provider Edge PE1.

The first comparison unit 308 also compares 110 the value of the counter 304 with a Low Threshold value ThDw and reduces the rate of generation of encapsulation packets if the counter is below said Low Threshold.

In a preferred embodiment the rate of generation of encapsulation packets is unchanged 114 if the counter is between said Low Threshold ThDw and Upper Threshold ThUp.

In a preferred embodiment the rate of generation of encapsulation packets depends on the encapsulated payload size output from a FIFO buffer 310 of the first Provider Edge PE1. In this embodiment the rate of generation of encapsulation packets is controlled by either encapsulating 116 a payload that is smaller 108 than a nominal payload or that is bigger 112 than said nominal payload. In this way an encapsulation packet with a smaller payload is generated 116 and thus such smaller payload is sent 118 to the second Provider Edge, but the problem of data underflow (i.e. the second Provider Edge receives less packets than expected) is mitigated because the encapsulation unit 306 has to wait a shorter time to have such reduced payload and in consequence the rate the encapsulation packets transmitted to the second Provider Edge PE2 is increased. On the contrary, if a problem of data overflow exists at the second Provider Edge PE2 (more packets received than expected) the payload that is encapsulated in the first Provider Edge PE1 is bigger than said nominal payload. This means that the encapsulation unit has to wait longer to have the increased payload and in consequence the encapsulation packets are sent to the second Provider Edge at a lower rate.

To illustrate this embodiment it is assumed that a nominal payload is set equal to 64 bytes. All the payload bytes from the first Customer Edge CE1 (i.e. data to be encapsulated) are written into the FIFO buffer 310. It is also assumed that the FIFO is 256 bytes long. If during the last packet transmitted towards the second Provider Edge PE2 the encapsulation unit 306 reads the FIFO bytes from addresses 101 to 164 (decimal) then until the next packet transmission the Read Address Bus 312 stays at the 164 value. Meanwhile the Write Address Bus 314 goes on and updates its value (modulo 256) at every new byte from the first Customer Edge CE1 that needs to be written. By doing a modulo 256 difference of Write Address Bus 314 and Read Address Bus 312 it is easy to calculate when 64 new bytes from first Customer Edge CE1 are accumulated into the FIFO 310. In this example, when the Write Address Bus 314 reaches the 228 value the second comparison unit 316 asserts a Start New Packet signal. This signal triggers the procedure that generates, 116, and transmits, 118, a new packet to the second Provider Edge PE2. All the overhead is generated and then the Address Generator 318 begins to run from 165 up to 228 reading all the needed 64 payload bytes. Meanwhile the Decrease Signal is asserted and the counter 304 decreases, 120, its value by one (because exactly one packet has been transmitted). If the first Customer Edge CE1 arrival rate and the second Provider Edge PE2 reference clock are locked (taking into account overhead) the value of the counter 304 will oscillate around a middle value. If for example central value is equal 101 then with every new timing message from the second Provider Edge PE2 the counter value goes from the central value to 102. Between two timing messages exactly two first Customer Edge CE1 groups of 64 bytes arrives, two packets are generated 116 sent 118 and the counter value goes to 101 and then to 100 and so on.

Figure 4:
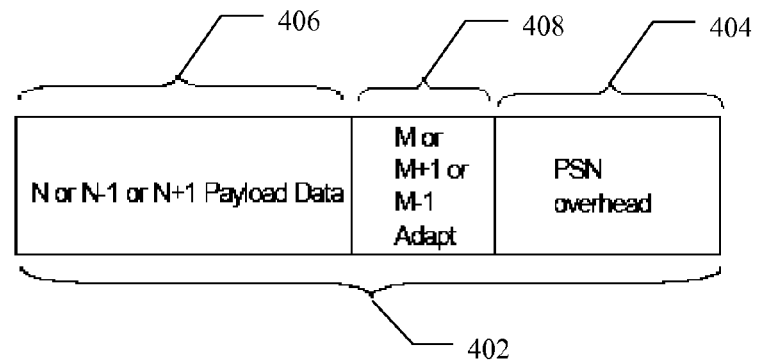
FIG. 4 is a diagram illustrating packet generation timing chart in one embodiment of the present invention.

In a preferred embodiment the size of the encapsulation packet 402 is constant. With reference to FIG. 4 an encapsulation packet is illustrated. PSN in FIG. 4 stands for Packet Switched Network i.e. a packet network. As shown in the figure it is not only the overhead 404 required by the packet networks, but also an adaptation level that is introduced to contain the justification information (justification signalling and stuffing bytes available). There is also the payload data that can be N or N−1 or N+1 bytes, 406, where N is a nominal or default payload size. Because the packet size is constant the adaptation layer is M or M+1 or M−1 bytes 408 and in this way the adaptation layer plus the payload reach the N+M constant size.

In a standard Circuit Emulation method the first Provider Edge PE1 generates a new packet toward PE2 with a constant rate that depends on the selected payload size. If, for example, PE1 and PE2 agreed (during the path setup) a 64 byte payload size, then PE1 generates a packet every time it collected 256 bytes from the first Customer Edge CE1. Bearing in mind that an E1 frame is 32 bytes, then PE1 will need to collect 8 E1 frames before new packet towards PE2 is generated. In this embodiment PE1 generates a new packet every 2 E1 frames. If CE1 generates an E1 frame every T seconds then PE1 generates a packet every 2×T seconds. In one embodiment T has the nominal value of 125 microseconds, but the exact value depends on the $f_s$ frequency ($f_s$ is called Service Frequency and is used by the CE1 clock) that can be up to ±50 ppm far from the nominal value of 2048 kHz. In short, the PE1 packet generation rate and the CE1 frame generation rate are strictly dependent (PE1 uses scaled CE1 clock, 2×T in the above example, to generate packets). The term Circuit Emulation is a generic term used by IETF and by ATM forum and also as a generic industrial term to indicate every method to transport TDM traffic through a packet data network.

If the second Provider Edge PE2 reference clock and the scaled (taking overhead into account) first Customer Edge CE1 reference clock are 1 ppm (part per million) far one from the other it can be expected that with no corrections after 1000000 of packets the second Provider Edge PE2 expected one more packet than the first Provider Edge PE1 sent to it. If the initial position of the writing and reading addresses in the receiving side (i.e. the second Provider Edge PE2) was for example 192 bytes far one from the other, 1000000 packets later their distance will be 64 bytes less, and after 3000000 of packets a receiving FIFO buffer 502 of the second Provider Edge PE2 will be in underrun and the traffic will be lost. Meanwhile, in accordance with one embodiment of this invention, the transmitting side, (i.e. the first Provider Edge PE1) will see the value of the counter 304 to increase because the number of packets expected by the second Provider Edge PE2 is bigger than the number of packets transmitted from the first Provider Edge PE1. The counter value will be eventually greater, 106, than the upper threshold ThUp and the transmission rate will be increased, i.e. the size of the payload will be reduced 108.

In one embodiment the counter 304 oscillates around its central value of 512 with a very small hysteresis (e.g. +/−8). This means that the upper threshold ThUp is 520 and the lower threshold ThDw is 504. If the value of the counter 304 is greater than 520 or lower than 504 then the first comparison unit 308 will set the payload size, which in the previous stable condition was set to a nominal payload size NomTh of 64 bytes, to a corrected value (65 bytes or 63 bytes according to the condition). In this example the second Provider Edge PE2 clock rate is the scaled first Customer Edge CE1 clock rate+1 ppm so it is necessary to generate more packets to avoid the receiving FIFO buffer 502 of the second Provider Edge PE2 going into underrun. As a consequence it is necessary to generate a new packets waiting only 63 clock cycles of the first Customer Edge CE1 instead of 64 and the payload size that is to be encapsulated is reduced to 63.

After the payload size correction the first Provider Edge PE1 generates packets 116 and sends them, 118, towards the second Provider Edge PE2 at a higher rate (i.e. corresponding to 63 clock cycles of the first Customer Edge CE1). In a preferred embodiment every encapsulation packet 402 contains justification information that indicates the second Provider Edge PE2 that 63 payload bytes are to be considered. The justification information indicates how the payload size of the packet differs from a nominal (or default) payload size. There are several methods of justifications known in the art that can be used here, e.g.: positive/negative opportunity bytes in an encapsulation intermediate layer, pointers in a ATM Adaptation Layers, AAL, (e.g. TDMoIP, which stands for TDM over IP and is the emulation of time-division multiplexing over a packet switched network). Because the generation rate of the first Provider Edge PE1 is corrected by more than 1 ppm it results in generating more packets than the second Provider Edge expects. As a consequence of that the value of the counter 304 decreases, 120. Eventually the counter value is lower than the upper threshold ThUp and the payload size is set again at its initial nominal payload size of 64 bytes.

Figure 3:
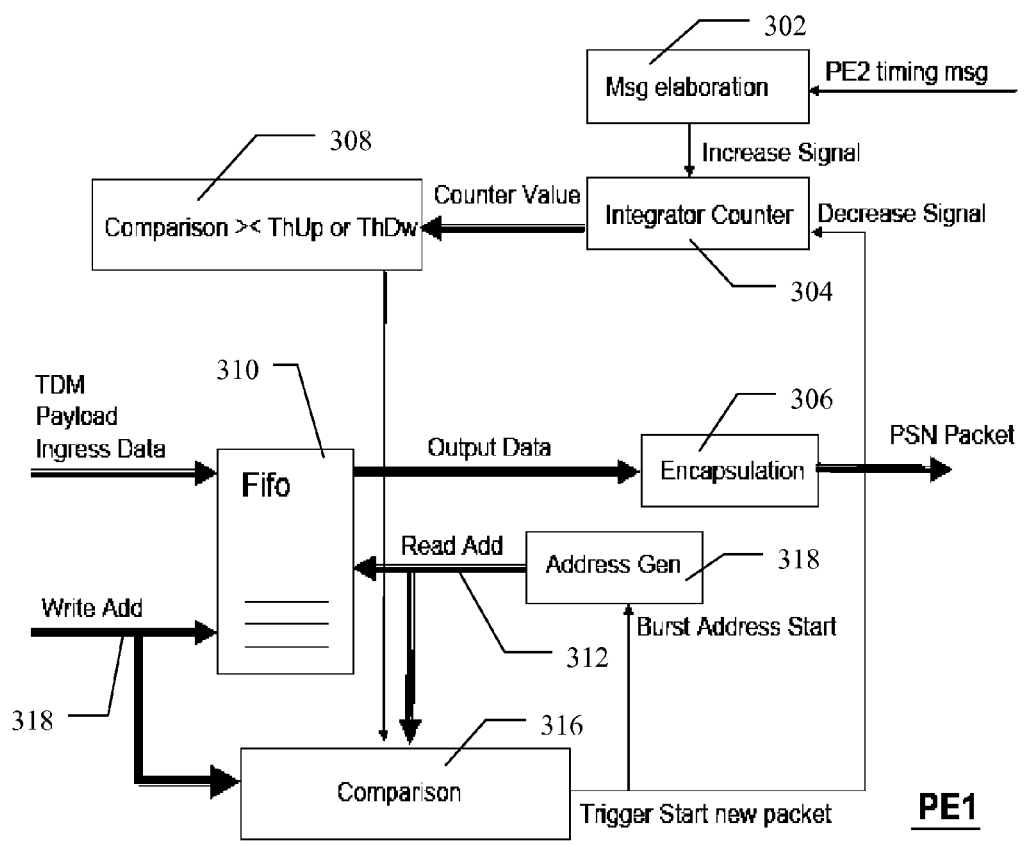
FIG. 3 is a diagram illustrating a network node in one embodiment of the present invention.
Figure 5:
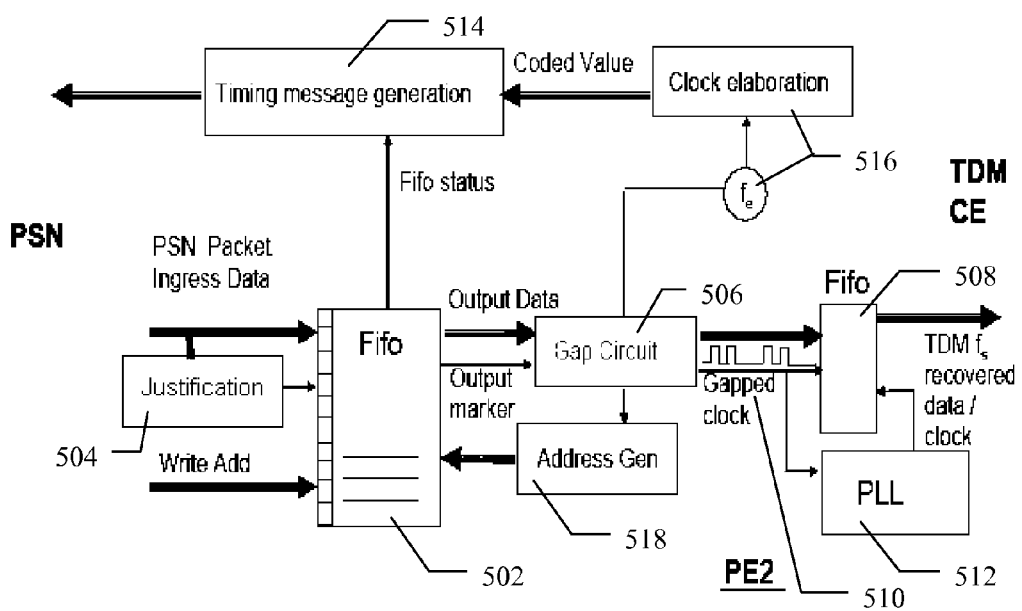
FIG. 5 is a diagram illustrating a network node of the communications network in one embodiment of the present invention.

The reference is now made to FIG. 2, FIG. 3 and FIG. 5. The overall system: first Provider Edge PE1—second Provider Edge PE2 acts like a big distributed locked loop that allows reaching a frequency locking state. In the transient time from start-up to locking state the mean position of the receiving FIFO 502 of the second Provider Edge PE2 write and read addresses is not controlled. As a result, when the locking state is reached and the FIFO 502 write and read addresses movements ended. In a preferred embodiment information about the receiving FIFO buffer 502 status is contained in the timing message. In one embodiment the timing message generated in a timing message generation unit 514 comprises information about a difference between a writing address and a reading address of the receiving FIFO buffer 502 of the second Provider Edge PE2. This information can be used to obtain a phase control in addition to discussed earlier frequency control. If it is detected at the first Provider Edge PE1 that the difference between the writing address and the reading address of the receiving FIFO buffer 502 of the second Provider Edge PE2 is smaller than a first predefined value the first Provider Edge PE1 reduces the payload size. The first Provider Edge PE1 increases the payload size if said difference between the writing address and the reading address is bigger than a second predefined value. In this case the first Provider Edge PE1 decodes not only the second Provider Edge PE2 frequency information (i.e. expected packets), but also its stable state pointers distance. In this way the first Provider Edge PE1 corrects its threshold from 64 to 63 or from 64 to 65 until both phase and frequency criteria are matched (like a phase frequency phase detector). In one embodiment the second comparison unit 316 has not only the input from the first comparison unit 308, but also an input of another unit (not shown) that reads and extracts the phase information from the PE2 incoming packet. In this embodiment the second comparison circuit 316 gives different priorities to the two inputs. In one embodiment it first decides the payload size basing its decision only on the counter 204 (frequency control) and then, only when the counter 204 has reached its stable position between the two thresholds, it considers the phase information input to decide the payload size until it reaches a stable and desired state too. In this embodiment, at any time, there are two control signals active and the frequency control signal takes precedence over the phase control signal.

In one embodiment the receiving FIFO buffer 502 size is for example 1024 bytes. At the card boot the reading address of this FIFO 502 is, for example, 512 and the writing address is, for example, 0. It means that the process starts with the maximum distance from reading to writing address (1024/2) and full FIFO 502 room available to handle the packet FDV (frame delay variation) and packet misordering. It is assumed that the scaled clock of the first Customer Edge CE1 used by the first Provider Edge PE1 for generating and sending packets to PE2 is slightly different from the clock of the second Provider Edge PE2. At the boot of the card the second Provider Edge PE2 starts generating and sending timestamps 514 to the first Provider Edge PE1, but some time is needed for the timestamps to arrive at the first Provider Edge PE1. Meanwhile, the writing and reading addresses of the receiving FIFO 502 move one towards the other. After a convergence time the relative distance of the second Provider Edge PE2 reading and writing address will be stable but there is no assurance that their relative distance will be the maximum one and in consequence there is less room available. Moreover the convergence period could occur again if some loss of signals occurs.

In one embodiment of the present invention the adverse effects of the timing message being lost between the second Provider Edge PE2 and the first Provider Edge PE1 are mitigated. If the timing message is lost the counter 304 is not updated and its value may eventually drop below the low threshold ThDw due to encapsulation packets being sent to the second Provider Edge PE2. In this embodiment the message elaboration unit 302 reads a timestamp from the received timing message and compares it with a timestamp from the previously received timing message. Because the second Provider Edge PE2 inserts into the timestamp field the value of its internal counter running with its reference clock 516 the message elaboration unit calculates time between these two timestamps and updates the counter 304 to a correct value if the time period between these two timestamps is bigger than the time period between two consecutive timestamps.

With reference to FIG. 5 the second Provider Edge PE2 is illustrated. The embodiment of the second Provider Edge PE2 shown in FIG. 5 is only one circuit implementation of several possible. In the receiving FIFO buffer 502 9 bit words are written containing a bit that indicates if the word is a payload or an overhead and 8 data bits. The reading side runs with a jitter-free reference clock 516 and reads all the receiving FIFO buffer 502 data (both overhead and payload). The second Provider Edge is PE2 receiving side first stores the packets received from the first Provider Edge PE1 and elaborates them with a proper and clean clock that is not impaired by the packet network noise. In one embodiment the second Provider Edge PE2 received 100 bytes packets from the first Provider Edge PE1. The packets are written into the receiving FIFO buffer 502 of the second Provider Edge PE2. After reading the 100 bytes packets the encapsulation overhead is discarded and the 63 or 64 or 65 bytes of payload are extracted. To do this it is necessary to have for every byte read from the receiving FIFO buffer 502 of the second Provider Edge PE2 information saying which byte is payload and must be extracted, which byte is overhead and must be discarded and which byte is stuff and must be discarded. To do this a number of different techniques are known in the art. In a preferred embodiment the second Provider Edge PE2 comprises a justification elaboration unit 504, which interprets the justification information received in overhead 404 of encapsulation packets 402 and, as a result of that, knows if 63 or 64 or 65 payload bytes are present in the payload 406 of the packet 402. In one embodiment of the present invention it can be carried out based on the fact that one bit is needed for every byte to indicate if that byte is useful or not. A 9 bit receiving FIFO buffer 502 of the second Provider Edge PE2 is used in this embodiment. In the receiving FIFO buffer 502 are written both, the packet bytes and also a bit indicating to the following circuit if the byte is to be used or discarded.

The following explains how to extract the payload only and recover the payload relative clock (the first Customer Edge, CE1, clock). The second provider Edge PE2 contains a gap circuit 506 connected to the receiving FIFO buffer 502. The gap circuit 506 elaborates all the data arriving from the receiving FIFO buffer 502 (overhead, payload and stuff, and, for each word, the justification bit) and writes inside a small second FIFO buffer 508 only the payload data. In addition it forwards a clock edge only in the payload positions, gapping, i.e. masking, the overhead edges 510. In this way a final stage PLL (Phase Locked Loop) 512 can easily recover the CE1 clock following the usual techniques of such cases. The usual, well known, methods include recovery of E1 from E3 (PDH multiplexing) or E1 from Vc12 (PDH from SDH). The address generator 518 is a simple counter that generates the receiving FIFO buffer 502 read addresses. If, for example, the

502 FIFO is a 512 word (9 bits) FIFO then the address generator 518 is a counter that rolls from 0 to 511 increasing at every $f_e/8$ clocks edges (from bits to bytes), where $f_e$ is a frequency used by the second Provider Edge clock (egress frequency). In this way it generates the reading address of the 502 FIFO and allows the gap circuit 506 reading cyclically all the data stored in the receiving FIFO buffer 502. These data contains payload and encapsulation/adaptation overhead. So the gap circuit passes through only the payload bytes and only the relative clock edges.

In short, the problem of addressing the network Frame Delay Variation and the problem of recovery of the CE1 clock are decoupled in two different FIFOs. A final loop has the task to recover the input frequency of the first Customer Edge CE1 (in one embodiment described above it is the E1 frequency) because the E1 frequency of the second Provider Edge PE2 egress must be the same as the E1 frequency in the first Provider Edge PE1 ingress. This final loop uses standard techniques of de-justification processes known from SDH implementations. In one embodiment this final loop takes the 100 bytes packets from the receiving FIFO buffer 502, discards the overhead and stuffing bytes and takes only the useful payload bytes (using some signalling bits already written into a 9-bit word of receiving FIFO buffer 502 or with other method). In one embodiment a digital or analogue PLL 512 to recover the E1 frequency can be used. It uses a second FIFO buffer 508, where it writes the useful payload bytes (63 or 64 or 65). It uses the gapped clock 510 because it writes the second FIFO buffer 508 only during the useful payload bytes and does not write (no clock edge) during the discarding overhead/stuff periods. The digital or analogue PLL recovers a continuous reliable clock to read this second FIFO buffer 508 in a proper way.

The invention claimed is:

1. A method of clock recovery of a Time Division Multiplex signal in a packet network comprising:
   a) receiving by a first Provider Edge a timing message from a second Provider Edge, wherein a counter in said first Provider Edge is increased upon reception of the timing message;
   b) sending by the first Provider Edge to the second Provider Edge encapsulated Time Division Multiplex packet traffic, wherein the counter is decreased upon sending a packet to the second Provider Edge;
   c) comparing the counter with an Upper Threshold value;
   d) increasing a rate of generation of the encapsulation packets if the counter is above said Upper Threshold;
   e) comparing the counter with a Low Threshold value; and
   f) reducing the rate of generation of encapsulation packets if the counter is below said Low Threshold.

2. The method according to claim 1 wherein the rate of generation of encapsulation packets is unchanged if the counter is between said Low Threshold and said Upper Threshold.

3. The method according to claim 1, wherein the rate of generation of encapsulation packets depends on the encapsulated payload size output from a FIFO buffer of the first Provider Edge and if the counter increases above the Upper Threshold the first Provider Edge reduces the payload size and if the counter decreases below the Low Threshold the first Provider Edge increases the payload size.

4. The method according to claim 1, comprising adding to the encapsulation packet justification information indicating how the payload size of the packet differs from a default payload size.

5. The method according to claim 1 comprising reading by the first Provider Edge a timestamp from the received timing message, comparing it with a timestamp from the previously received timing message, calculating time between these two timestamps and correcting the counter if the time period between these two timestamps is bigger than the time period between two consecutive timestamps.

6. The method according to claim 5, wherein the timing message comprises information about a difference between a writing address and a reading address of an input FIFO buffer of the second Provider Edge.

7. The method according to claim 6, wherein if it is detected at the first Provider Edge that the difference between the writing address and the reading address of the input FIFO buffer of the second Provider Edge is smaller than a first predefined value the first Provider Edge reduces the payload size and increases the payload size if said difference between the writing address and the reading address is bigger than a second predefined value.

8. The method according to claim 1, wherein the size of the encapsulation packet is constant.

9. The method according to claim 4, wherein the encapsulation packet contains information about justification applied in all previous encapsulation packets sent from the first Provider Edge to the second Provider Edge in the current communication session.

10. A communications network node operable in Time Division Multiplex, the communications network node comprising:
    a message elaboration unit for receiving a timing message from a second Provider Edge;
    a message encapsulation unit operable to encapsulate Time Division Multiplex traffic into packets and to send these encapsulation packets to the second Provider Edge;
    a counter operable to be increased upon reception of the timing message and decreased upon sending the encapsulation packet; and
    a first comparison unit operable to compare the counter with an Upper Threshold value and with a Low Threshold value,
    wherein the node is operable to increase a rate of generation of the encapsulation packets if the counter is above said Upper Threshold or to reduce the rate of generation of encapsulation packets if the counter is below said Low Threshold.

11. The node according to claim 10 wherein the node is operable to keep the rate of generation of encapsulation packets unchanged if the counter is between said Low Threshold and said Upper Threshold.

12. The node according to claim 10 comprising a FIFO buffer, wherein the rate of generation of encapsulation packets depends on the encapsulated payload size output from said FIFO buffer and the node is operable to reduce the payload size if the counter increases above the Upper Threshold and to increase the payload size if the counter decreases below the Low Threshold.

13. The node according to claim 10, wherein the encapsulation unit is operable to add to the encapsulation packet a justification information indicating how the payload size of the packet differs from a default payload size.

14. The node according to claim 10, wherein the message elaboration unit is operable to read a timestamp from the received timing message and to compare it with a timestamp from the previously received timing message, the message elaboration unit is further operable to calculate a time period between these two timestamps and correct the counter if the time period between these two timestamps is bigger than the time period between two consecutive timestamps.

15. The node according to claim 14, wherein the timing message comprises information about a difference between a writing address and a reading address of an input FIFO buffer of the second Provider Edge.

16. The node according to claim 15, wherein the encapsulation unit is operable to reduce the payload size if the message elaboration unit detects that the difference between the writing address and the reading address of the input FIFO buffer of the second Provider Edge is smaller than a first predefined value and operable to increase the payload size if said difference between the writing address and the reading address is bigger than a second predefined value.

17. The node according to claim 10, wherein the size of the encapsulation packet is constant.

18. The node according to claim 13, wherein the encapsulation packet contains information about justification applied in all previous encapsulation packets sent from said node to the second Provider Edge in the current communication session.

19. A communications network operable in Time Division Multiplex, the communications network comprising:
   at least a first Customer Edge connected to a first Provider Edge; and
   a second Customer Edge connected to a second Provider Edge, wherein:
   the connections between the Customer Edges and the Provider Edges operate in Time Division Multiplex and the first Provider Edge is operable to receive a timing message from the second Provider Edge;
   a counter in said first Provider Edge is increased upon reception of the timing message;
   the first Provider Edge is also operable to send to the second Provider Edge encapsulated Time Division Multiplex packet traffic, wherein the counter is decreased upon sending an encapsulation packet to the second Provider Edge and the first Provider Edge is operable to compare the counter with an Upper Threshold value and with a Low Threshold value, and to increase a rate of generation of the encapsulation packets if the counter is above said Upper Threshold or to reduce the rate of generation of encapsulation packets if the counter is below said Low Threshold.

20. A communications network node operable in Time Division Multiplex, the communications network node comprising:
   a timing message generation unit for sending timing messages;
   a clock;
   a counter running with said clock and the value of the counter being added to the timing messages in said timing message generation unit;
   a receiving FIFO buffer for receiving encapsulation packets from a communications network node as defined in claim 11;
   an address generator operable to generate read addresses of the receiving FIFO buffer;
   a gap circuit connected to the receiving FIFO buffer and to a second FIFO buffer, wherein the gap circuit is operable to forward clock edges in positions of payload and masking other clock edges; and
   a Phase Locked Loop unit operable to recover from the gapped clock signal a clock signal used for timing the payload encapsulated in said encapsulation packets.

* * * * *

UNITED STATES PATENT AND TRADEMARK OFFICE
CERTIFICATE OF CORRECTION

PATENT NO. : 8,315,262 B2
APPLICATION NO. : 12/678163
DATED : November 20, 2012
INVENTOR(S) : Toscano Page 1 of 1

It is certified that error appears in the above-identified patent and that said Letters Patent is hereby corrected as shown below:

On the Face Page, in Field (56), under "OTHER PUBLICATIONS", in Column 2, Line 4, delete "asychronous" and insert -- asynchronous --, therefor.

In Fig. 3, Sheet 2 of 3, delete "  " and insert --  --, therefor.

Signed and Sealed this
Second Day of April, 2013

Teresa Stanek Rea
*Acting Director of the United States Patent and Trademark Office*